US009590346B2

(12) United States Patent
Hemmi et al.

(10) Patent No.: US 9,590,346 B2
(45) Date of Patent: Mar. 7, 2017

(54) CONNECTING MECHANISM HAVING TWO CONTACTS WITH CONTACT SURFACES INCLINED IN A DIRECTION PERPENDICULAR TO THEIR MATING DIRECTION

(71) Applicant: OMRON Corporation, Kyoto-shi, Kyoto (JP)

(72) Inventors: Yoshinobu Hemmi, Shiga (JP); Hirotada Teranishi, Osaka (JP); Takahiro Sakai, Shiga (JP); Yuki Kotake, Kanagawa (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 14/897,585

(22) PCT Filed: May 30, 2014

(86) PCT No.: PCT/JP2014/064522
§ 371 (c)(1),
(2) Date: Dec. 10, 2015

(87) PCT Pub. No.: WO2014/199850
PCT Pub. Date: Dec. 18, 2014

(65) Prior Publication Data
US 2016/0126656 A1    May 5, 2016

(30) Foreign Application Priority Data
Jun. 13, 2013   (JP) .................................. 2013-124545

(51) Int. Cl.
H01R 24/00   (2011.01)
H01R 33/00   (2006.01)
(Continued)

(52) U.S. Cl.
CPC ............ H01R 13/405 (2013.01); B32B 3/266 (2013.01); H01R 12/58 (2013.01); H01R 12/71 (2013.01);
(Continued)

(58) Field of Classification Search
CPC ...... H01R 12/71; H01R 23/02; H01R 23/725; H01R 23/7073; H01R 14/00; H01R 33/00;
(Continued)

(56) References Cited

U.S. PATENT DOCUMENTS 4,900,278 A * 2/1990 Yamada ............... H01R 13/193
439/857
5,131,852 A * 7/1992 Grabbe ............. H01L 23/49861
257/E23.066
(Continued)

FOREIGN PATENT DOCUMENTS

JM   2009-283357 A   12/2009
JP   H01-164682 U    11/1989
(Continued)

OTHER PUBLICATIONS

International Search Report issued in PCT/JP2014/064522 mailed on Aug. 5, 2014 (2 pages).

*Primary Examiner* — Chandrika Prasad
(74) *Attorney, Agent, or Firm* — Osha Liang LLP

(57) ABSTRACT

A connecting mechanism having a male contact and a female contact, each of the male and female contacts having a first surface including at least in part a flat surface portion defined therein, a second surface opposing the first surface, and a contact surface extending between the first surface and the second surface. The contact surface is designed so that, when the first contact and the second contact are electrically connected with each other, the contact surfaces of the first (Continued)

contact and the second contact make a surface contact therebetween that inclines with respect to the flat surface portions of the first and second contacts in a cross section that crosses the first surface, the second surface, and the contact surface.

7 Claims, 6 Drawing Sheets

(51) Int. Cl.
| | |
|---|---|
| *H01R 13/405* | (2006.01) |
| *H01R 24/60* | (2011.01) |
| *H01R 12/71* | (2011.01) |
| *H01R 13/11* | (2006.01) |
| *H01R 12/58* | (2011.01) |
| *H01R 13/04* | (2006.01) |
| *B32B 3/26* | (2006.01) |
| *H01R 43/16* | (2006.01) |

(52) U.S. Cl.
CPC .............. *H01R 13/04* (2013.01); *H01R 13/11* (2013.01); *H01R 24/60* (2013.01); *H01R 43/16* (2013.01); *B32B 2307/202* (2013.01); *B32B 2307/206* (2013.01); *B32B 2457/00* (2013.01)

(58) Field of Classification Search
CPC ...... H01R 13/40; H01R 13/405; H01R 13/41; H01R 24/00; H01R 24/60; H01R 24/62; H01R 43/16
USPC .......................................................... 439/660
See application file for complete search history.

(56) References Cited

U.S. PATENT DOCUMENTS

| | | | | |
|---|---|---|---|---|
| 5,738,532 | A * | 4/1998 | Takano | H01R 43/16 439/64 |
| 6,336,829 | B2 * | 1/2002 | Matsukawa | 439/636 |
| 8,337,261 | B2 * | 12/2012 | Hemmi | H01R 12/716 439/660 |
| 2009/0209142 | A1 * | 8/2009 | Sasaoka | H01R 43/16 439/862 |
| 2012/0238158 | A1 * | 9/2012 | Yoshida | H01R 13/03 439/884 |
| 2014/0329418 | A1 * | 11/2014 | Ishikawa | C25D 1/00 439/729 |

FOREIGN PATENT DOCUMENTS

| | | |
|---|---|---|
| JP | 2006-066349 A | 3/2006 |
| JP | 2007-242383 A | 9/2007 |
| JP | 2011-028933 A | 2/2011 |
| JP | 2012-155930 A | 8/2012 |
| WO | 2011/111639 A1 | 9/2011 |

* cited by examiner

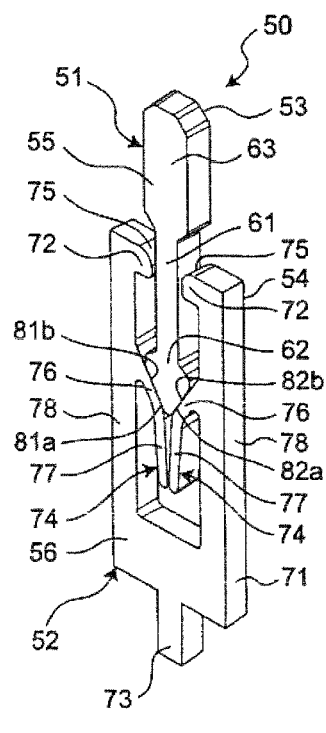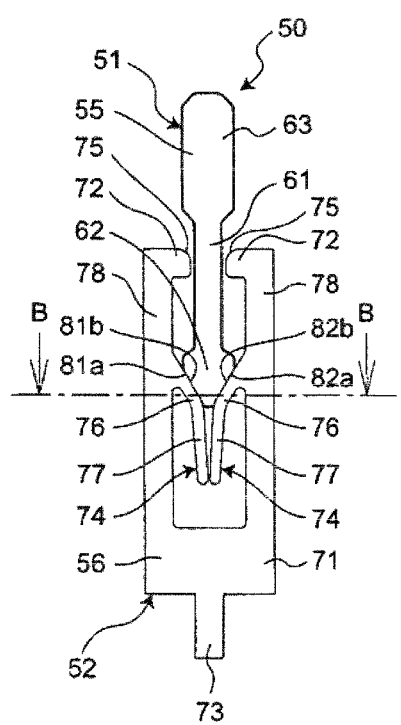

CONNECTING MECHANISM HAVING TWO CONTACTS WITH CONTACT SURFACES INCLINED IN A DIRECTION PERPENDICULAR TO THEIR MATING DIRECTION

TECHNICAL FIELD

This invention relates to a connecting mechanism to be incorporated in a connector.

BACKGROUND

Conventionally, there has been disclosed a connecting mechanism in, for example, Patent Document 1, which includes a plug connector having a plug contact and a receptacle connector having a receptacle contact. The plug contact and the receptacle contact are designed so that they are brought into contact with each other to make an electrical connection therebetween.

PRIOR ART DOCUMENT(S)

Patent Document 1: JP2009-283357(A)

A recent trend of miniaturization of the connector results in a small and low profile connecting mechanism. This necessarily decreases a contact area of the contacts and thereby increases a contact resistance and an amount of heat generated at the contact portions, which eventually reduces an amount of electricity to be fed across the contacts.

Further, the reduction of contact area between the contacts may need an increased force for insertion of the plug contact into the receptacle contact, increasing a contact resistance between the contacts to, for example, break thin coatings plated on the contacts and thereby shorten the life-span of the connecting mechanism.

Accordingly, the present invention is to provide a long life connecting mechanism with reduced contact resistance which results in decreased heat generation at the contacts and increased amount of electricity to be fed across the contacts.

SUMMARY

In view of the foregoing, a connecting mechanism according to one aspect of the invention comprises:
a first contact and a second contact, each of the first and second contacts having
a first surface including at least in part a flat surface portion defined therein;
a second surface opposing the first surface; and
a contact surface extending between the first surface and the second surface;
the contact surface being designed so that, when the first contact and the second contact are electrically connected with each other, the contact surfaces of the first contact and the second contact make a surface contact therebetween that inclines with respect to the flat surface portions of the first and second contacts in a cross section that crosses the first surface, the second surface, and the contact surface.

According to one aspect of the invention of the connecting mechanism, this ensures an increased contact area between the first contact and the second contact, which is larger than that can be formed by contact surfaces parallel to the orthogonal planes. This reduces a contact resistance, which in turn reduces heat to be generated at the contact surfaces and increases current capacity. This also reduces a contact force and a resultant frictional damage to be applied on the contact surfaces at the insertion of the first contact into the second contact, which in turn reduces frictional damages, which ensures an extended life span of the connecting mechanism. It may not be restricted that the first surface is parallel to the second surface.

In another aspect of the invention of the connecting mechanism, the first contact and the second contact may be made by electroforming process in which a voltage is applied in a direction that is parallel to the orthogonal plane.

According to this aspect of the invention, a small and low profile connecting mechanism is provided in a few manufacturing process.

In another aspect of the invention of the connecting mechanism, each of the contact surfaces of the first and second contacts may be inclined at an angle equal to or less than 45 degrees with respect to the orthogonal plane.

According to this aspect of the invention, the connecting mechanism gets an expected resistance, with the inclined angle of the contact surfaces with respect to the orthogonal planes less than 45 degrees.

In another aspect of the invention of the connecting mechanism, the second contact may have a substantially U-shaped when viewed from its front, that extends parallel to the flat surface portions, and the first contact has a cross section that is engageable with the substantially U-shaped from the front view.

According to this aspect of the invention, the connecting mechanism is provided a wide socket and easy connection, and easy manufacturing.

In another aspect of the invention, the first contact may have a frame-like.

According to this aspect of the invention, the frame structure of the first contact can reduce weight, material, and manufacturing cost of the male contact 1.

In another aspect of the invention, the second contact may have an opposed edges to define an opening for receiving the first contact therebetween, at least one of the edges including an engaging nail for retaining the first contact between the edges.

According to this aspect of the invention, the connecting mechanism ensures an enhanced contact reliability due to the fact that the engaging nail engages the first contact to prevent it from disengaging from the second contact.

In another aspect of the invention of the connecting mechanism, a contact portion, provided at one end of the first contact having an configuration which is capable of inserted into the second contact, may make contact with a pair of contact arms which each extend downward from an inner surface opposed to the second contact having a substantially U-shaped when viewed from its front.

According to this aspect of the invention, a greater freedom and is provided for the designing of the connecting mechanism.

In another aspect of the invention of the connecting mechanism, each of the opposed edges of the second contact may have an retaining nail for retaining the first contact between the edges.

According to this aspect of the invention, the connecting mechanism ensures an enhanced contact reliability due to the fact that the retaining nail engages the first contact to prevent it from disengaging from the second contact.

A connecting mechanism according to one aspect of the invention comprising:
a first contact and a second contact each made by electroforming process;

each of the first and second contacts having a contact surface that is inclined at an angle with respect to a direction along which a voltage was applied in the electroforming process;

the angles of the contact surface of the first contact and the contact surface of the second contact being the same; and the contact surface of the first contact and the contact surface of the second contact making a surface contact therebetween when the first and second contacts are electrically connected to each other.

According to this aspect of the invention, this ensures an increased contact area between the first contact and the second contact, which is larger than that can be formed by contact surfaces parallel to the orthogonal planes. This reduces a contact resistance, which in turn reduces heat to be generated at the contact surfaces and increases current capacity. This also reduces a contact force and a resultant frictional damage to be applied on the contact surfaces at the insertion of the first contact into the second contact, which in turn reduces frictional damages, which ensures an extended life span of the connecting mechanism. Furthermore, a small and low profile connecting mechanism is provided in a few manufacturing process.

In another aspect of the invention of the connecting mechanism, the first contact has a first surface including at least in part a first flat surface portion defined therein;

the second contact has a second surface including at least in part a second flat portion defined therein; and the surface contact extends between the first surface and the second surface thereof so that the flat surface portion is orthogonal to the direction along which a voltage was applied in the electroforming process.

According to this aspect of the invention, a greater freedom is provided for the designing of the connecting mechanism.

A substrate for manufacturing process according to one aspect of the invention of the connecting mechanism comprising:

a conductive member;

an electrically insulative member placed on the conductive member; and wherein the insulative member forms a cavity to extend through the insulative member, which is enable to be divided from the conductive member.

According to this aspect of the invention of the manufacturing process for the substrate, the insulative member can be altered according to the design requirements.

BRIEF DESCRIPTION OF THE DRAWINGS

FIG. 3A is a perspective view showing the engaged connecting mechanism according to the second embodiment of the invention before it is assembled;

FIG. 3B is a side elevational view of the connecting mechanism in FIG. 3A;

DETAILED DESCRIPTION OF THE EMBODIMENTS

With reference to the accompanying drawings, a connecting mechanism according to an embodiment of the invention will be described below.

First Embodiment

Figure 1A:
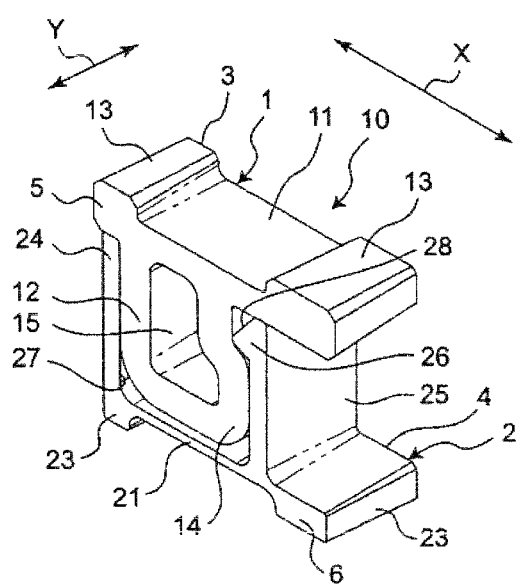
FIG. 1A is a perspective view showing a first embodiment of a connecting mechanism according to the invention in which the mechanism is in an assembled condition.
Figure 1B:
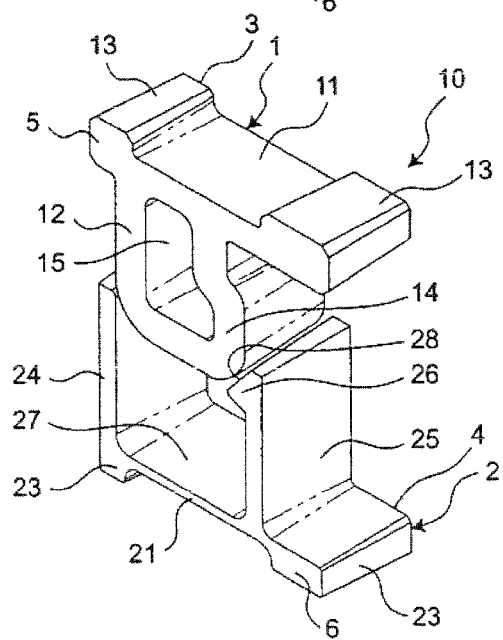
FIG. 1B is a perspective view showing the connecting mechanism before it is assembled.

As shown in FIGS. 1A and 1B, a connecting mechanism generally indicated at 10 according to the first embodiment of the invention has a first contact or male contact 1 and a second contact or female contact 2, both manufactured by electroforming process.

The contact 1, which is in the form of substantially P-shaped when viewed from its front, has a flat plate portion 11 and a frame-like insertion portion 12 provided on one side of a bottom surface of the flat plate portion 11. The flat plate portion 11 has at its opposite ends upwardly projected soldering portions 13 to be soldered. The insertion portion 12 is substantially U-shaped and has at its one side an outwardly deformed locking projection 14. The male contact 1 has at its substantially center an opening 15 surrounded by the flat plate portion 11 and the insertion portion 12. A first surface 3 and a second surface 5 of the male contact 1, defined by planes orthogonal to the thickness-wise Y-direction of the male contact 1, are planar and opposed parallel to each other.

The female contact 2, which is substantially U-shaped when viewed from its front, has a flat plate portion 21 and a pair of elastic retaining portions 24 and 25 projecting upward from the flat plate portion 21. The flat plate portion 21 has soldering portions 23 at opposite bottom ends thereof. The elastic retaining portion 24 is positioned at one end of the flat plate portion 21. The elastic retaining portion 25 is positioned at a portion of the flat plate portion 21, somewhat away from the opposite end of the flat plate portion 21. The flat plate portion 21 and the elastic retaining portions 24 and 25 define a U-shaped recess 27. An upper end of the elastic retaining portion 25 defines one opening edge of the recess 27 and has an engaging nail 26 with an inclined surface 28 extending obliquely into the recess 27. Similar to the first surface 3 and the second surface 5 of the male contact 1, a first surface 4 and a second surface 6 of the female contact 2, defined by planes orthogonal to the widthwise Y-direction of the female contact 2, are planar and opposed parallel to each other.

In assembling of the male contact 1 and the female contact 2, the insertion portion 12 of the male contact 1 shown in FIG. 1B is press-fitted in the recess 27 of the female contact 2. At the beginning of assembling, the locking projection 14 of the insertion portion 12 is brought into contact with the inclined surface 28 of the engaging nail 26. Forcing the insertion portion 12 into the recess 27 results in that the locking projection 14 elastically deforms the elastic retaining portion 25 outwardly to clear its way into the recess 27.

Once the insertion portion 12 is fully fitted in the recess 27, the engaging nail 26 engages the proximal portion of the locking projection 14.

Figure 2A:
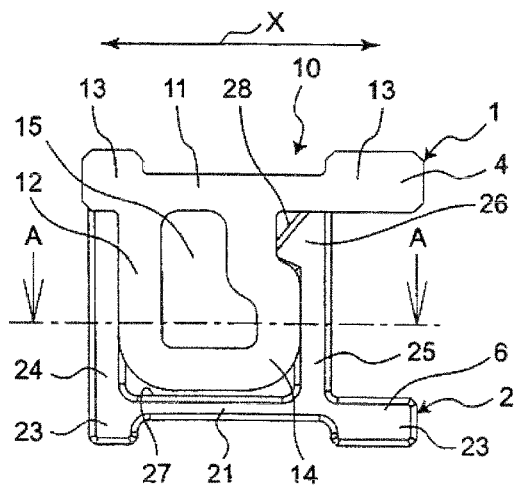
FIG. 2A is a front view of the connecting mechanism shown in FIG. 1A.

In this engaged condition where the male contact 1 is fully fitted in the female contact 2 as shown in FIG. 2A, the insertion portion 12 makes an electric contact with the elastic retaining portion 24 and also the locking projection 14 makes an electric contact with the elastic retaining portion 25. Also, the engaging nail 26 of the elastic retaining portion 25 holds the elastic retaining portion 25 from moving out of the recess 27.

Figure 2B:
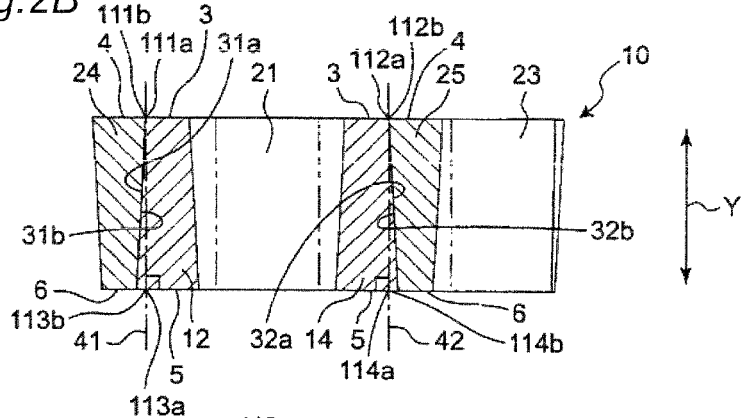
FIG. 2B is a cross sectional view taken along line A-A in FIG. 2A.
Figure 2C:
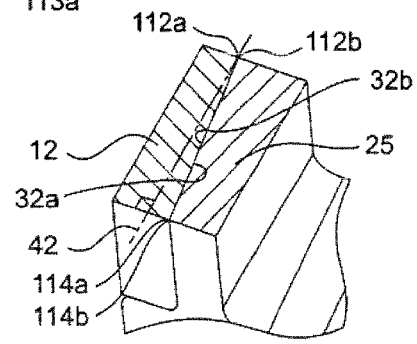
FIG. 2C is an enlarged, partially broken-away perspective view showing a contact portion of connecting mechanism.

As shown in FIGS. 2B and 2C, the male contact 1 and the female contact 2 are designed so that the contact surface 31a of the insertion portion 12 and the contact surface 31b of the elastic retaining portion 24 oppose the contact surface 32a of the locking projection 14 and the contact surface 32b of the elastic retaining portion 25, respectively, and also those surfaces 31b, 31b and 32a, 32b are inclined to respective surfaces 41 and 42 extending orthogonal to the widthwise X-direction of the male contact 1 and the female contact 2. The contact surfaces 31a and 32a of the male contact 1 extends between the first surface 3 and the second surface 5 thereof. The contact surfaces 31b and 32b of the female contact 2 extends between the first surface 4 and the second surface 6 thereof.

In other words, the contact surfaces 31a and 31b are inclined to a surface 41 which extends orthogonally to the first surface 3 and the second surface 5 of the male contact 1 and also the first surface 4 and the second surface 6 of the female contact 2. Likewise, the contact surfaces 32a and 32b are inclined to a surface 42 which extends orthogonally to the first surface 3 and the second surface 5 of the male contact 1 and also the first surface 4 and the second surface 6 of the female contact 2. The contact surface 31a intersects the first surface 3 of the male contact 1 to define an intersection line 111a, and the contact surface 31b intersects the first surface 4 of the female contact 2 to define an intersection line 111b. Also, the contact surface 31a intersects the second surface 5 of the male contact 1 to define an intersection line 113a, and the contact surface 31b intersects the second surface 6 of the female contact 2 to define an intersection line 113b. Further, the contact surface 32a intersects the first surface 3 of the male contact 1 to define an intersection line 112a, and the contact surface 32b intersects the first surface 4 of the female contact 2 to define an intersection line 112b. Furthermore, the contact surface 32a intersects the second surface 5 of the male contact 1 to define an intersection line 114a, and the contact surface 32b intersects the second surface 6 of the female contact 2 to define an intersection line 114b.

This means that the intersection lines 111a and 111b defined by the contact surfaces 31a and 3 1b and the first surface 3 of the male contact 1 and the first surface 4 of the female contact 2 are positioned on the orthogonal plane 41, and the intersection lines 112a and 112b defined by the contact surfaces 32a and 32b and the first surface 3 of the male contact 1 and the first surface 4 of the female contact 2 are positioned on the orthogonal plane 42. Neither of the intersection lines 113a and 113b defined by the contact surfaces 31a and 31b and the second surface 5 of the male contact 1 and the second surface 6 of the female contact 2 is positioned on the orthogonal plane 41. Also, neither of the intersection lines 114a and 114b defined by the contact surfaces 32a and 32b and the second surface 5 of the male contact 1 and the second surface 6 of the female contact 2 is positioned on the orthogonal plane 42.

Each of the contact surface 31a of the male contact 1 and the contact surface 31b of the female contact 2 defines a certain angle with the orthogonal plane 41 and also each of the contact surface 32a of the male contact 1 and the contact surface 32b of the female contact 2 defines a certain angle with the orthogonal plane 42, which ensures an electrical surface contact between the first contact 1 and the second contact 2.

As described above, the connecting mechanism 10 so constructed ensures that the male contact 1 and the female contact 2 have contact surfaces 31a and 31b and contact surfaces 32a and 32b, inclined to the orthogonal planes 41 and 42. This ensures an increased contact area between the male contact and the female contact 2, which is larger than that can be formed by contact surfaces parallel to the orthogonal planes 41 and 42. This reduces a contact resistance, which in turn reduces heat to be generated at the contact surfaces 31a, 31b, 32a, and 32b and increases current capacity. This also reduces a contact force and a resultant frictional damage to be applied on the contact surfaces 31a, 31b, 32a, and 32b at the insertion of the male contact 1 into the female contact 2, which in turn reduces frictional damages and ensures an extended life span of the connecting mechanism 10.

Also, the provision of the soldering portions 13 and 23 on the opposite ends of the flat plate portion 11 of the male contact 1 and the flat plate portion 21 of the female contact 2 allows the assembled male and female contacts 1 and 2 to be secured on a housing (not shown) with an enhanced retaining force, without causing an uneven contact with the housing.

Further, the above-described connecting mechanism 10 ensures an enhanced contact reliability due to the fact that the engaging nail 26 of the elastic retaining portion 25 of the female contact 2 engages the locking projection 14 of the male contact 1 to prevent it from disengaging from the female contact 2.

Furthermore, the frame structure of the male contact 1 can reduce weight, material, and manufacturing cost of the male contact 1.

Although the male contact 1 is substantially P-shaped in the previous embodiment, it is not limited thereto and can take any configuration provided that the male contact 1 is capable of being engagingly assembled with the female contact 2. Also, although the female contact 2 is substantially U-shaped in the previous embodiment, it is not limited thereto and can take any configuration provided that the female contact is capable of being engaging with the male contact 1.

Although the insertion portion 12 of the male contact 1 has one engaging projection 14, it is not limited thereto and may have two engaging projections. In this embodiment, they may be symmetrically provided on left and right sides of the male contact 1. Also, in this embodiment, left and right engaging projections may have different sizes.

Although each of the first surface 3 and the second surface 5 of the male contact 1 and the first surface 4 and the second surface 6 of the female contact 2 is thoroughly made of flat surface in the previous embodiment, this is not restrictive to the invention. For example, the first surfaces 3 and 4 of the male and female contacts 1 and 2 may be flat only in regions adjacent the intersection lines 111 and 112.

Although discussions have been made to the connecting mechanism 10 in which the contact surfaces 31a and 32a are non-parallely tapered in one direction and also the contact surfaces 31b and 32b are non-parallely tapered in the opposite direction, the contact surfaces 31a and 32a and the contact surfaces 31b and 32b may be parallel to each other. Both contact surfaces 31a and 31b need not be inclined to the orthogonal plane 41 and both contact surfaces 32a and 32b need not to be inclined to the orthogonal plane 42, i.e., at least one of the contact surfaces 31a and 31b may be inclined to the orthogonal plane 41 and at least one of the contact surfaces 32a and 32b may be inclined to the orthogonal plane 42.

In the previous embodiment, the first surface 3 and the second surface 5 of the male contact 1 need not to be parallel to each other and the first surface 4 and the second surface 6 of the female contact 2 need not to be parallel to each other.

Second Embodiment

As shown in FIGS. 3A and 3B, a connecting mechanism 50 according to the second embodiment has a male contact (first contact) 51 and a female contact (second contact) 52. Similar to the first embodiment, the male contact 51 and the female contact 52 are manufactured by the electroforming process. According to this embodiment, the male contact 51 and the female contact 52 are formed symmetrically when viewed from front.

The male contact 51 has a plate-like liner portion 61, a contact portion 62 provided at one end of the linear portion 61, and a soldering portion 63 provided at the opposite end of the linear portion 61. The contact portion 62 is tapered so as to have a substantially triangular configuration when viewed from front. The soldering portion 63 has a substantially rectangular configuration when viewed from front. The linear portion 61 has a width smaller than those of the contact portion 62 and the soldering portion 63.

The female contact 52 has a base which is substantially U-shaped when viewed from front. The base 71 has a rectangular column-like soldering portion 73 extending downward from the central portion thereof with respect to the widthwise direction thereof. The base 71 also has a pair of retaining nails 72 formed to oppose to each other at upper ends thereof adjacent the opening. The retaining nails 72 are projected inwardly from the opposing inner surface edges of the base 71. The retaining nails 72 also have surfaces 75 inclined to the projected directions of the retaining nails 72. The base 71 has contact arms 74 formed at substantially intermediate height inner surface portions thereof. Each of the contact arms 74, which extends downward and toward a widthwise center of the base 71, has a first arm 76 extending along the contour of the contact portion 62 of the male contact 51 and a second arm 77 extending downward at an inclined angle greater than that of the first arm 76.

In assembling the male contact 51 with the female contact 52, the contact portion 62 of the male contact 51 is moved between the retaining nails 72 of the female contact 52 so that the contact portion 62 makes contacts with the curved surfaces 75 of the retaining nails 72. Then, further advancement of the contact portion 62 of the male contact 51 forces the retaining nails 72 away from each other, causing the side portions 78 of the base 71 to elastically deflect outwardly along the widthwise-direction. Once the contact portion 62 is passed through retaining nails 72 to break the contacts between the contact portion 62 and the retaining nails 72, the base 71 returns its original position. Then, further advancement of the male contact 51 makes an electrical contact between the contact portion 62 and the contact arms 74 of the base 71.

As shown in FIGS. 3A and 3B, when the male contact 51 is assembled and engaged in the female contact 52, the contact portion 62 of the male contact 51 is forced onto the first arms 76 of the female contact 52. Also, the retaining nails 72 of the base 71 engage the contact portion 62 of the male contact 51 to prevent the male contact 51 from dropping out from the base 71.

Figure 4:
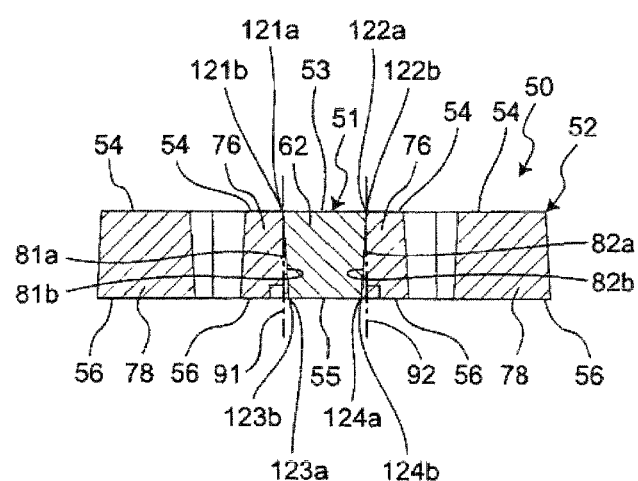
FIG. 4 is a cross sectional view taken along line B-B in FIG. 3B.

As shown in FIG. 4, the contact surfaces 81a and 81b and the contact surfaces 82a and 82b defined by the contact portion 62 of the male contact 51 and the first arms 76 of the female contact 52 are oppose to each other and tapered so that they are inclined to the planes 91 and 92 orthogonal to the widthwise surfaces of the male contact 51 and the female contact 52. The contact surfaces 81a and 82a extend between the first surface 53 and the second surface 55 of the male contact 51. The contact surfaces 81b and 82b extend between the first surface 54 and the second surface 55 of the female contact 52.

Specifically, the contact surfaces 81a and 81b are inclined to the plane 91 orthogonal to the first surface 53 and the second surface 55 of the male contact 51 and also the first surface 54 and the second surface 56 of the female contact 52. Also, the contact surfaces 82a and 82b are inclined to the plane 92 orthogonal to the first surface 53 and the second surface 55 of the male contact 51 and also the first surface 54 and the second surface 56 of the female contact 52. The contact surface 81a and the first surface 53 of the male contact 51 forms an intersection line 121a, and the contact surface 81b and the first surface 54 of the female contact 52 forms an intersection line 121b. The contact surface 81a and the second surface 55 of the male contact 51 forms an intersection line 123a, and the contact surface 81b and the second surface 56 of the female contact 52 forms an intersection line 123b. The contact surface 82a and the first surface 53 of the male contact 51 forms an intersection line 122a, and the contact surface 81b and the first surface 54 of the female contact 52 forms an intersection line 122b. The contact surface 82a and the second surface 55 of the male contact 51 forms an intersection line 124a, and the contact surface 82b and the second surface 56 of the female contact 52 forms an intersection line 124b.

The intersection lines 121a and 121b formed by the contact surfaces 81a and 81b, the first contact surface 53 of the male contact 51, and the first contact surface 54 of the female contact 52 exist on the orthogonal plane 91, and the intersection lines 122a and 122b formed by the contact surfaces 82a and 82b, the first contact surface 53 of the male contact 51, and the first contact surface 54 of the female contact 52 exist on the orthogonal plane 92. The intersection lines 123a and 123b formed by the contact surfaces 81a and 81b, the second contact surface 55 of the male contact 51, and the second contact surface 56 of the female contact 52 do not exist on the orthogonal plane 91, and the intersection lines 124a and 124b formed by the contact surfaces 82a and 82b, the second contact surface 55 of the male contact 51, and the second contact surface 56 of the female contact 52 do not exist on the orthogonal plane 92.

The contact surface 81a of the male contact 51 and the contact surface 81b of the female contact 52 and also the contact surface 82a of the male contact 51 and the contact surface 82b of the female contact 52 form a certain inclined angle with the orthogonal planes 91 and 92, which forms electrical surface contacts between the male contact 51 and the female contact 52.

As described above, according to the connecting mechanism 50 so constructed, the male contact 51 and the female contact 52 have contact surfaces 81 and 81b, and 82a and 82b which form the inclined angle or angles with the orthogonal planes 91 and 92. This increases the contact area than the connecting mechanism which uses contact surfaces parallel to the orthogonal planes This reduces a contact resistance, which in turn reduces heat to be generated at the contact surfaces 81a, 81b, 82a, and 82b and increases current capacity. This also reduces a contact force and a resultant frictional damage to be applied on the contact surfaces 81a, 81b, 82a, and 82b at the insertion of the male contact 51 into the female contact 52, which ensures an extended life span of the connecting mechanism 10.

Also, because the retaining nails 72 provided at the opening edges of the base 71 of the female contact 52 engage and retain the contact portion 62 of the male contact 51, which ensures an enhanced contact reliability between the male and female contacts.

Although in the previous embodiment of the connecting mechanism 50 the contact surfaces 81a and 81b form a tapered angle with the contact surfaces 82a and 82b, the contact surfaces 81a and 81b may be parallel to the contact surfaces 82a and 82b. Also, both the contact surfaces 81a and 81b and the contact surfaces 82a and 82b need not to be inclined to the orthogonal planes 91 and 92. For example, the contact surfaces 81a and 81b or the contact surfaces 82a and 82b may be inclined to the orthogonal planes 91 and 92.

Although in the previous embodiment each of the first surface 53 and the second surface 55 of the male contact 51 and the first surface 54 and the second surface 56 of the female surface contact 52 is thoroughly made of flat surface in the previous embodiment, this is not restrictive to the invention. For example, the first surfaces 53 and 54 of the male and female contacts 1 and 2 may be flat only in regions adjacent the intersection lines 111 and 112.

In the previous embodiment, the first surface 53 and the second surface 55 of the male contact 51 need not to be parallel to each other and the first surface 54 and the second surface 56 of the female contact 52 need not to be parallel to each other.

Figure 5A:
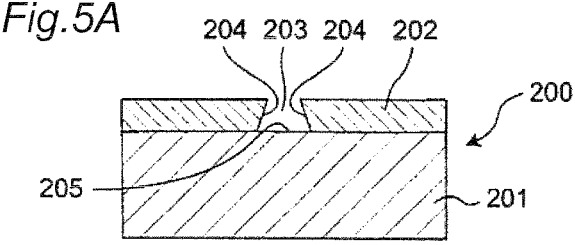
FIGS. 5A-5C are diagrams illustrating processes in an exemplary manufacturing method of the connecting mechanism.

A description will now be made to a manufacturing process of the contacts using an electroforming technique. Specifically, referring to FIGS. 5A-5C, a process for manufacturing the male contact 51 will be described.

As shown in 5A, a substrate 200 is provided which has an electrically conductive member or plate 201 and an electrically insulative member or plate 202 which is placed on the conductive plate 201. A cavity 203 is formed in the insulative plate 202 which is formed and surrounded by inclined side surfaces 204. The cavity 203 extends through the insulative plate 202 to reach the underlying conductive plate 201. A part of the conductive plate 201 is exposed at the bottom of the cavity 203. The exposed surface portion 205 is thoroughly flat. The substrate 200 is immersed in an electrolyte bath with the exposed surface portion 205 of the conductive plate 201 opposed to an electrode not shown. Then, a voltage is applied between the conductive plate 201 and the opposed electrode. By the application of the voltage between the conductive plate 201 and the opposed electrode, ions of the metal in the electrolyte bath are deposited on the exposed surface portion 205 of the conductive plate 201.

Figure 5B:
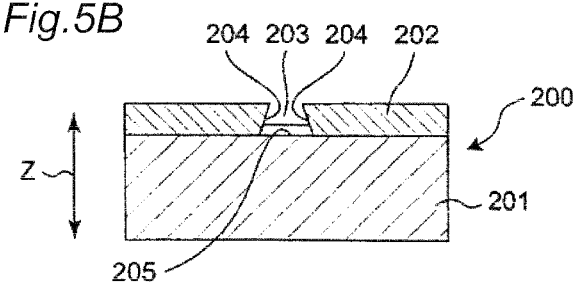

Next, as shown in FIG. 5B, the deposition of the metal ions is continuously performed during the application of the voltage between the substrate 200 and the opposed electrode. One surface of the deposited metal layer, opposing the exposed surface 205, forms the side surface 53 of the male contact 51, and the other surface facing the opening of the cavity 203 forms the opposite side surface 55. The surfaces adjacent the inclined side surfaces 204 form the contact surfaces 81a and 82b of the male contact 51. As described above, the side surfaces 53 and 55 of the male contact 51 are formed to incline with respect to the opposing direction Z along with the voltage is applied. Also, the contact surfaces 81a and 82a are formed to incline with respect to the direction Z.

Figure 5C:
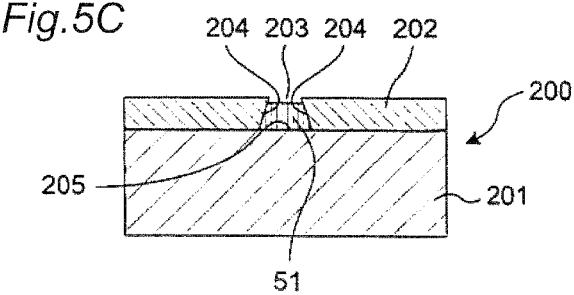

As shown in FIG. 5C, the application of the voltage is continued until the deposited metal layer reaches a predetermined height. The metal layer deposited in the cavity 203 forms the male contact 51.

Although in the above-described manufacturing process the exposed surface portion 205 of the conductive plate 201 in the cavity 203 is thoroughly flat, this is not restrictive. The exposed surface 205 may be in part flat only in a region which is adjacent the inclined side surface 204, which ensures that the contact surfaces 81a and 82a of the male contact 51 have a predetermined angle.

The exposed surface 205 may be inclined thoroughly, convexly or concavely curved, or stepped. In this instance, an adjustment of the inclined angle of the side surfaces 204 of the insulative plate 202 can alter the angle of the contact surfaces 81a and 82a of the male contact 51. As described above, the electroforming technique allows precise manufacturing of various contacts with different contact angles and of the connecting mechanism with enhanced flexibility of design.

According to the above described manufacturing technique, the angle of the contact surfaces 81a and 82a of the male contact 51 may be altered simply by using an insulative plate with different side surface angle. This means that the inclined angle of the side surface 204 of the insulative plate 202 can be altered according to the design requirements.

The female contact 52 may be manufactured using the above described electroforming process. In this instance, the contact surfaces 81b and 82b of the female contact 52 may have the same inclined angle as the contact surfaces 81a and 82a of the male contact 51, which forms electrical surface contacts between the male contact 51 and the female contact 52.

Although not described, the male contact 1 and the female contact 2 may be manufactured by the above-described electroforming technique.

Preferably, the inclined angles of the contact surfaces 31a, 31b, 32a, and 32b with respect to the orthogonal planes 41 and 42 and of the contact surfaces 81a, 81b, 82a, and 82b with respect to the orthogonal planes 91 and 92 are about 0-45 degrees, more preferably equal to or less than eight degrees.

This is because the fact that the inclined angles of the contact surfaces 31a, 31b, 32a, and 32b with respect to the orthogonal planes 41 and 42 is more than 0 degree ensures an increased contact areas therebetween than the non-inclined contact surfaces parallel to the orthogonal planes 41 and 42. If an inclined angle of the contact surfaces 31a, 31b, 32a, and 32b with respect to the orthogonal planes 41 and 42 is more than 45 degrees of the contact surfaces 31a and 31b with respect to the orthogonal planes 41 and 42, the contact surfaces 31a, 31b, 32a, and 32b receive considerably increased force at the connection of the male and female contacts 1 and 2, which disadvantageously causes a lateral displacement between the male and female contacts 1 and 2 to reduce the contact area between the male and the female contacts 1 and 2.

If on the other hand the inclined angle of the contact surfaces 31a, 31b, 32a, and 32b with respect to the orthogonal planes 41 and 42 is less than eight degrees, more than 99% of the force to be transmitted through the contact surfaces 31a, 31b, 32a, and 32b acts as contact force therebetween, which ensures sufficient contact force and contact area between the contact surfaces.

The same applies to the angle of inclination between the contact surfaces 81a, 81b, 82a, 82b and the vertical planes 91 and 92.

Figure 6A:
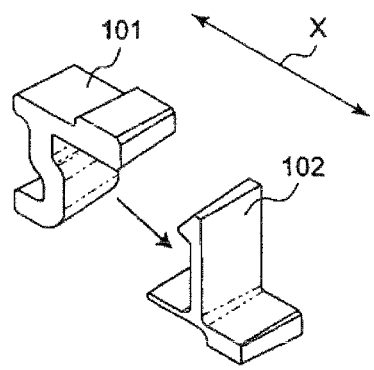
FIG. 6A is a perspective view showing a third embodiment of a connecting mechanism according to the invention before it is assembled.
Figure 6B:
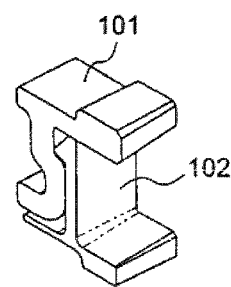
FIG. 6B is a perspective view showing the assembled connecting mechanism.

Although in the first and second embodiments the male contacts 1 and 51 are engagingly fitted in the female contacts 2 and 52 to make electrical connections therebetween, respectively, they may be connected in a manner without using that fitting connection. For example, as shown in FIG. 6 showing a third embodiment of the invention, the male contact 101 may be electrically connected with the female contact 102 by forcing them toward each other to make a contact therebetween.

INDUSTRIAL APPLICABILITY

The connecting mechanism of the invention is not limited to the first or second embodiment described above and it may have a configuration capable of being incorporated in another connector.

PARTS LIST 1, 51, 101: male contact (first contact)
2, 52, 102: female contact (second contact)
3, 53: the first surface of the male contact
4, 54: the first surface of the female contact
5, 55: the second surface of the male contact
6, 56: the second surface of the female contact
10, 50: connecting mechanism
11, 21: flat plate portion
12: insertion portion
13, 23, 63, 73: soldering portion
14: locking projection
15: opening
24, 25: elastic retaining portion
26: engaging nail
27: recess
28: inclined surface
31a, 31b, 32a, 32b, 81a, 81b, 82a, 82b: contact surface
41, 42, 91, 92: orthogonal plane
61: linear portion
62: contact portion
71: base
72: retaining nail
74: contact arm
75: curved surface
76: first arm
77: second arm
78: side portion
111a, 111b, 112a, 112b, 113a, 113b, 114a, 114b, 121a, 121b, 122a, 122b, 123a, 123b, 124a, 124b: intersection line

The invention claimed is:

1. A connecting mechanism, comprising:
a first contact; and
a second contact, the first contact and the second contact being configured to be electrically connected with each other;
wherein the first contact has
a first surface extending in a first direction;
a second surface opposing the first surface of the first contact; and
a first contact surface extending between the first surface and the second surface of the first contact in a second direction perpendicular to the first direction;
the second contact has
a first surface extending in the first direction;
a second surface opposing the first surface of the second contact; and
a first contact surface extending between the first surface and the second surface of the second contact in the second direction;
the first contact surface of the first contact and the first contact surface of the second contact being inclined with respect to the second direction so that, when the first contact and the second contact are electrically connected with each other, the first contact surface of the first contact and the first contact surface of the second contact make a surface contact therebetween.

2. The connecting mechanism of claim 1, wherein
the first contact has a second contact surface opposing the first contact surface of the first contact,
the second contact has a second contact surface opposing the first contact surface of the second contact,
the first and second contact surfaces of the first contact are inclined with respect to the second direction to define a first taper angle therebetween and
the first and second contact surfaces of the second contact are inclined with respect to the second direction to define a second taper angle therebetween, the first taper angle being substantially the same as the second taper angle so that, when the first contact and the second contact are electrically connected with each other, the first and second contact surfaces of the first contact and the first and second contact surfaces of the second contact make surface contacts therebetween.

3. The connecting mechanism of claim 1, wherein the first contact and the second contact are made by electroforming process in which a voltage is applied in the second direction.

4. The connecting mechanism of claim 2, wherein the first taper angle and the second taper angle is equal to or less than 45 degrees.

5. The connecting mechanism of claim 2, wherein the first contact has a substantially U-shaped cross section in a plane extending in the first direction and the second contact has a substantially U-shaped cross section in the plane extending in the first direction,
the substantially U-shaped cross section of the first contact including the opposed first contact surface and the second contact surface of the first contact and the substantially U-shaped cross section of the second contact including the opposed first contact surface and the second contact surface of the second contact,
the substantially U-shaped cross section of the first contact being engageable within the substantially U-shaped cross section of the second contact when the when the first contact and the second contact are electrically connected with each other.

6. The connecting mechanism of claim 5, wherein the second contact has a base portion and a pair of opposing wall portions extending perpendicularly from opposite ends of the base portion to define the substantially U-shaped cross section of the second contact, and one of the wall portions has a locking portion projecting toward the other of the wall portions for engaging with the substantially U-shaped cross section of the first contact to retain the substantially U-shaped cross section of the first contact within the substantially U-shaped cross section of the second contact.

7. The connecting mechanism of claim 6, wherein the substantially U-shaped cross section of the first contact has a portion which is engageable with the locking portion of the second contact.

* * * * *